(12) United States Patent
Finkenzeller et al.

(10) Patent No.: US 8,816,827 B2
(45) Date of Patent: Aug. 26, 2014

(54) DATA STORAGE MEDIUM AND METHOD FOR CONTACTLESS COMMUNICATION BETWEEN THE DATA STORAGE MEDIUM AND A READER

(71) Applicant: Giesecke & Devrient GmbH, Munich (DE)

(72) Inventors: Klaus Finkenzeller, Unterföhring (DE); Karl Eglof Hartel, München (DE); Denny Brandl, Eching (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 14/057,230

(22) Filed: Oct. 18, 2013

(65) Prior Publication Data

US 2014/0043145 A1 Feb. 13, 2014

Related U.S. Application Data

(63) Continuation of application No. 12/304,653, filed as application No. PCT/EP2007/005185 on Jun. 12, 2007, now Pat. No. 8,581,706.

(30) Foreign Application Priority Data

Jun. 12, 2006 (DE) .......................... 10 2006 027 200

(51) Int. Cl.
| | |
|---|---|
| *H04Q 5/22* | (2006.01) |
| *G06Q 20/34* | (2012.01) |
| *G07F 7/10* | (2006.01) |
| *G06K 7/00* | (2006.01) |
| *G06K 7/10* | (2006.01) |
| *G06K 19/07* | (2006.01) |

(52) U.S. Cl.
CPC .......... *G06K 7/10118* (2013.01); *G06Q 20/341* (2013.01); *G07F 7/1008* (2013.01); *G06K 7/00* (2013.01); *G06K 19/0723* (2013.01); *G06Q 20/357* (2013.01)
USPC ..... 340/10.4; 340/10.1; 340/10.2; 340/10.41; 340/10.42

(58) Field of Classification Search
USPC ................. 340/10.1, 10.2, 10.4, 10.41, 10.42
See application file for complete search history.

(56) References Cited

U.S. PATENT DOCUMENTS

| | | |
|---|---|---|
| 6,421,196 B1 | 7/2002 | Takayama et al. |
| 2004/0199784 A1 | 10/2004 | Irisawa et al. |
| 2005/0007236 A1 | 1/2005 | Lane et al. |

(Continued)

FOREIGN PATENT DOCUMENTS

| | | |
|---|---|---|
| EP | 1450299 A1 | 8/2004 |
| WO | 2006/010943 A1 | 2/2006 |

*Primary Examiner* — Andrew Bee
(74) *Attorney, Agent, or Firm* — Bacon & Thomas, PLLC

(57) ABSTRACT

A method and a data carrier for contactless communication of a reading device with at least two communication-ready applications located on a portable data carrier. A first communication-readiness signal is generated for a first application and sent to the reading device, the signal having a first identification number that is assigned to the first application and indicates to the reading device the communication readiness of said first application, and a second communication-readiness signal is generated and sent for a second application, the second signal having a second identification number different from the first identification number, which is assigned to said second application and indicates to the reading device the communication readiness of the second application. The identification numbers simulate for the reading device the communication readiness of a data carrier in each case. The reading device thus has the impression of communicating with applications of two separate data carriers.

38 Claims, 4 Drawing Sheets

(56) References Cited

U.S. PATENT DOCUMENTS

| | | |
|---|---|---|
| 2005/0066039 A1 | 3/2005 | Ayatsuka et al. |
| 2006/0065731 A1 | 3/2006 | Powell et al. |
| 2006/0206343 A1 | 9/2006 | Nakanishi et al. |
| 2007/0274242 A1 | 11/2007 | Lamacraft et al. |
| 2008/0109899 A1 | 5/2008 | Rijnswou Van et al. |
| 2009/0243810 A1 | 10/2009 | Pendlebury et al. |

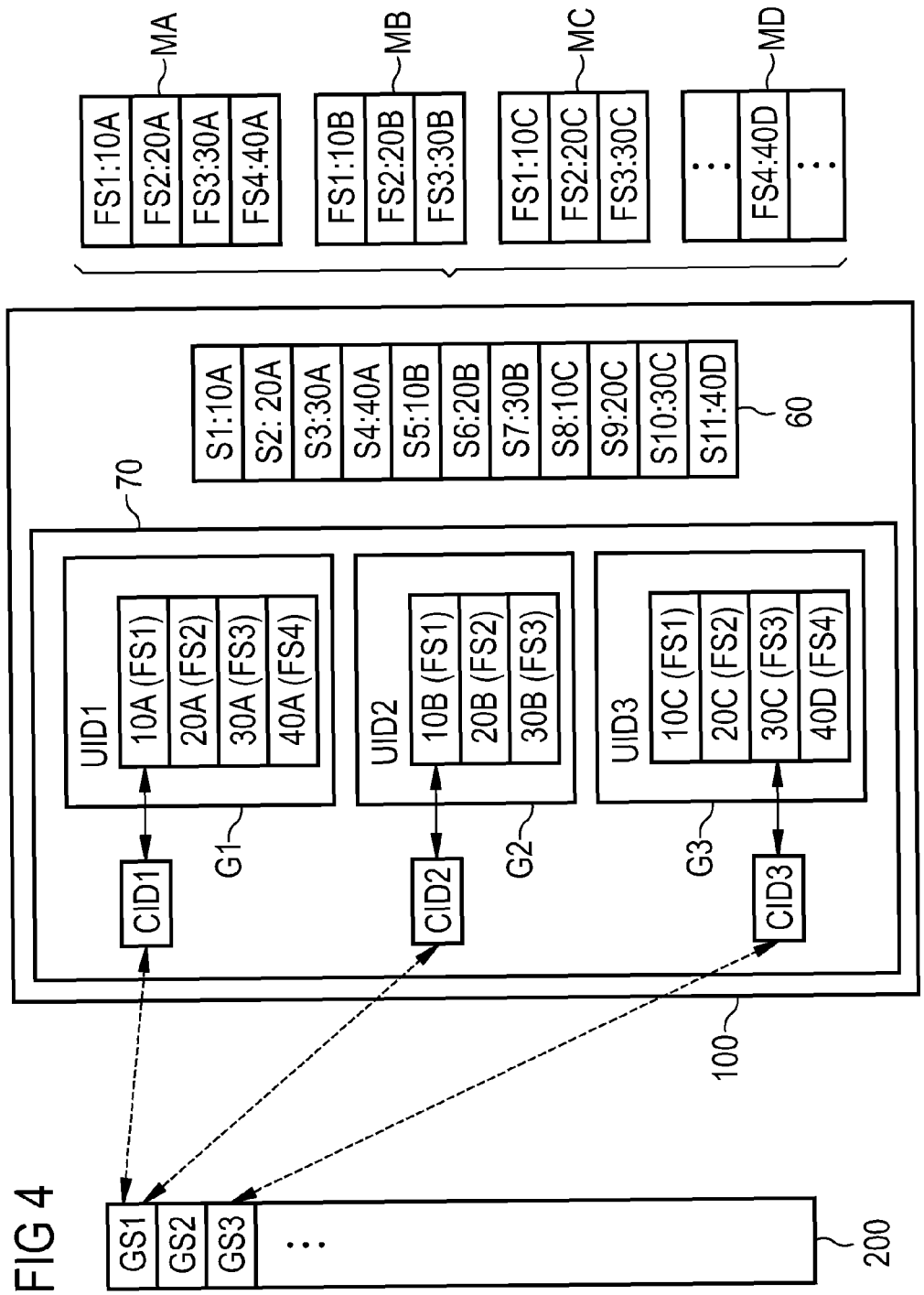

DATA STORAGE MEDIUM AND METHOD FOR CONTACTLESS COMMUNICATION BETWEEN THE DATA STORAGE MEDIUM AND A READER

FIELD OF INVENTION

The present invention relates to a method for contactless communication of at least two applications stored on a common portable data carrier with a reading device, and to an accordingly set up data carrier. A data carrier according to the invention may be e.g. a contactlessly communicating chip card, a contactlessly communicating label, a contactlessly communicating identification document, a security module SAM (secure application module) equipped for contactless communication, or an electronic device, such as a mobile terminal with an NFC interface, equipped for contactless communication.

BACKGROUND

In the prior art (e.g. Finkenzeller, Klaus: RFID-Handbuch, Munich, 2002) there are described various contactlessly communicating data carriers, for example chip cards and RFID transponders (radio frequency identification transponders), e.g. according to the standard ISO/IEC 14443. These are so-called proximity coupling chip cards, which are frequently used in the application field of ticketing, that is, as public transport tickets for example. The energy supply to the data carrier is normally effected here by the magnetic alternating field of a reading device. The range of such a data carrier is approx. 7 to 15 cm. The invention is not restricted to transponder chip cards with such short ranges, however, but can also be used in connection with other contactlessly communicating data carriers with other ranges and/or according to other standards. It is fundamentally also possible to use data carriers with their own energy source.

When such a data carrier is brought into the response field of a reading device, thereby commencing its energy supply and putting it in an operational mode, it can receive a search signal emitted cyclically by the reading device and indicate its communication readiness to the reading device by means of a first response signal. As soon as the reading device has received this signal it starts a selection process using a so-called anti-collision method in order to specifically select one data carrier for further communication when a plurality of communication-ready data carriers are located in the response field of the reading device at the same time. However, there are also reading devices that communicate via proprietary, nonstandard communications protocols and do not support any anti-collision methods.

The selection of a data carrier is effected in the case of an anti-collision method on the basis of a unique identification number of the data carrier, for example a UID (unique identifier), a PUPI (pseudo-unique PICC identifier, PICC=proximity ICC, ICC=integrated circuit card) or the like. For data carriers according to ISO/IEC 14443 it further holds that a data carrier selected for communication is addressable during communication via a unique session number (session-ID, CID) allocated dynamically by the reading device. In this state such a data carrier no longer responds to the aforementioned search signals still emitted by the reading device. In this way the reading device can select further data carriers located in the response field via their unique identification numbers and also assign them unique session numbers in turn. According to ISO/IEC 14443, up to 16 data carriers can in this way be selected for communication at the same time and addressed accordingly via 16 different session numbers. A command emitted by the reading device and addressed by means of the session number is then always processed only by the data carrier to which said session number was assigned.

Further, it is known that a plurality of applications can be located on a portable data carrier at the same time and that the corresponding application processes can be executed concurrently when an operating system providing the necessary mechanisms is set up on the data carrier. Concurrent execution of processes means that the latter are executed quasi at the same time by repeatedly toggling between different processes. Toggling between different processes means that said processes are supplied to the processor alternatingly to obtain actual computing time. An application process designates an application that is undergoing execution. In the context of this invention, both an application and the associated application process will hereinafter always be designated as an application.

It is possible to address a plurality of different concurrent applications, for example via their application identifiers AIDs, via different logical channels. Logical channels make it possible to set a plurality of virtual channels in parallel via a single interface by the corresponding communications protocols being so designed that the addressed logical channel is also coded. In this way a plurality of applications on the data carrier can thus be addressed in parallel via the application identifier by specification of the particular channel to be used.

The currently common protocols and the coding of the data to be transferred (APDU, application protocol data unit, a form of data transfer based on a command/response scheme) allow up to four logical channels which are coded by means of two special bits. However, the data carrier's responses generated upon a command received from outside the data carrier no longer contain any information about the logical channel. This has the consequence that external applications desiring to communicate with a plurality of concurrent applications on a data carrier must be synchronized with each other, since an external application cannot decide by the response of an application of the data carrier whether it is the response expected by it or is intended for another external application.

The management of logical channels is very elaborate for an operating system of the data carrier and requires a great amount of memory, all the more so if communication has to take place under secure conditions, i.e. the data belonging to an application are transferred in encrypted form and are protected in general against spying by other applications.

Problems also occur in cases where a plurality of possibly proprietary applications that were hitherto each stored as the only application on a separate data carrier are now to be integrated on a common data carrier configured as a multiapplication data carrier. In addition to the above-described difficulties in parallel communication, collisions can take place in the data structures, because the different applications have for example hitherto identified different contents on different data carriers by identical file identifiers FIDs that now identify only one file on the common data carrier. It also happens that applications from different data carriers are to be integrated that are subject to different restrictions in the communications parameters, such as the block length of transferable blocks.

SUMMARY

It is the object of the present invention to specify a method permitting contactless communication of a plurality of mutually uncoordinated applications of a portable data carrier with a reading device, as well as an accordingly set up data carrier.

The present inventive method is based on the idea that, for at least two applications located on a portable, contactlessly communicating data carrier that are ready to communicate with a reading device, a first communication-readiness signal to the reading device is generated for a first of the at least two applications, the signal comprising a first identification number assigned to the first of the at least two applications and indicating to the reading device the communication readiness of said first application, and a second communication-readiness signal to the reading device is generated for a second of the at least two applications, the second signal comprising a second identification number different from the first identification number, which is assigned to the second application and indicates to the reading device the communication readiness of said second application. These steps are carried out by an accordingly set up communication device on the data carrier.

The identification numbers perform the role played in the prior art by the identification number (UID, PUPI and the like) assigned to the data carrier. The reading device can thus address one application of a plurality of applications located on a data carrier selectively and independently of the data carrier via the identification number. A customary reading device has the impression of communicating with different data carriers.

In this connection it is also possible that the communication-readiness signals are generated in each case for groups of applications and indicate to the reading device the communication readiness of each of the corresponding applications of the particular group. All applications in such a group are assigned the same identification number here. It is possible to assign each of the applications in a group additional selection information which permits the applications within a group to be distinguished. In this way the applications can be arranged in a hierarchical manner.

When the communication of an application with a reading device is spoken of hereinafter, this will always mean the communication taking place via a communication device of the data carrier, whereby the reading device selectively addresses said application and the data directed to the application are passed on to said application via the communication device of the data carrier. This holds in particular also when the data carrier has further communication-ready applications located thereon, or applications that are already communicating with the reading device or have already been suspended by the reading device after completion of communication.

The signals from the data carrier generated for the applications can be e.g. periodically emitted signals or specific response signals to search signals emitted by the reading device. The reading device can thus recognize which communication-ready applications are located in its response field even when they are stored on a common data carrier.

A toggle functionality present on the data carrier can toggle between different applications executed on the data carrier concurrently. In this way a plurality of applications can be engaged in communication with the reading device quasi simultaneously, whereby the toggling between said applications permits parallel communication thereof with the reading device via the communication device. However, the communication also can take place consecutively rather than in parallel, adapted to the abilities of the reading device.

The aforementioned restrictions in connection with the use of logical channels cease to exist. It is possible for more than four applications to communicate with the reading device in parallel. The communication device ensures that all data that are sent to the data carrier by the reading device are processed only by the addressed application. It ensures in particular that all data emitted to the reading device by the data carrier are so constituted that the reading device can assign them uniquely to one application.

Finally, there results the advantage that a plurality of applications can be integrated on a common data carrier independently of each other and without having to be mutually coordinated, since toggling between the applications allows each of the applications to have its own data structures, for example a file system, and its own software means, such as program code only used by it. Collisions with further applications regarding these resources are thus ruled out.

The toggle functionality can be configured as part of the operating system. The toggle between different applications can be effected e.g. by branching. In branching, a so-called parent process starts a new process, the child process. Both processes, parent and child, use the same system resources, such as working memory. A toggle can, on the other hand, e.g. also be effected by a context switch by means of a dispatcher. Here, the particular process currently assigned to the processor is given its own context which comprises for example areas in the main memory and system variables.

The reading device selects an application for further communication by means of the identification number assigned to the application. The additional selection information optionally assigned to the application can also be used for selection by the reading device. An application selected for further communication is then assigned a session number dynamically by the reading device. Via said session number the application can be addressed uniquely during communication with the reading device. Upon addressing, the session number is so linked in the data carrier by the communication device with the identification number assigned to the application and optionally the additional selection information that the correct application is always addressed upon communication. When an application has been selected for further communication by the reading device, said communication takes place subsequently without requiring any further steps. An application selected for further communication by the reading device is thus then engaged in communication with the reading device.

According to the method, the data carrier generates communication-readiness signals for one or more applications located on the data carrier that have not yet been selected for further communication by the reading device even when one or more other applications have already been selected for further communication by the reading device and the communication with said other applications is not yet completed. This is preferably also the case after one or more other applications have already been suspended by the reading device after completion of communication. A further activity of the application suspended by the reading device on the data carrier, separately from the communication with the reading device, is still possible.

While according to the prior art a data carrier engaged in communication does not respond to search signals and a suspended data carrier either must first be removed from the response field of the reading device and be brought back into it to be communication-ready again, or is reset by a RESET signal from the reading device, a reading device can establish contact with all communication-ready applications of the inventive data carrier at any time.

The communication device controls the total communication between the applications and the reading device and always knows the communication status of each application:

communication-ready or selected by the reading device for further communication and thus communicating with the reading device or suspended by the reading device after completion of communication.

The data carrier informs the reading device preferably by means of collision signals that communication-ready applications that have not yet been selected for further communication are present in the response field. Said signals, which are emitted during execution of the collision algorithm, can take the form for example of simulated collisions between a plurality of applications. The reading device will then emit search signals in parallel with the communication with other applications and/or after the end of communication in order to establish contact with the applications not yet selected for communication.

The communication device of the data carrier can preferably recognize by the responses of the reading device to emitted communication-readiness signals whether the reading device is able to resolve a collision between a plurality of applications. In this connection a termination of communication by the reading device in case more than one data carrier is located in the response field of the reading device can also be interpreted as a response of the reading device. If the data carrier recognizes, for example, that the reading device can always process only one application in its response field, the emission of further communication-readiness signals can be adapted thereto. The data carrier thereafter emits a communication-readiness signal for an application only when the reading device has completed communication with another application.

The method preferably stores in a nonvolatile memory, by means of the communication device, information about which of the applications was last selected for further communication by the reading device. This makes it possible to ascertain upon reactivation of the data carrier, for example after an interruption of the energy supply, which application last communicated with the reading device, to then generate a communication-readiness signal first for an application different therefrom, in order e.g. to prevent the same application from always being served first and other applications from possibly having to put up with long waiting periods or not being executed at all.

The method can therefore be so designed that the reading device can communicate with a plurality of applications in parallel. The identification numbers assigned to the applications are preferably so selected here that the reading device interprets them like identification numbers of different data carriers. The inventive method can then be carried out with reading devices according to the prior art without any problems.

In the case of reading devices expecting to communicate with MIFARE memory cards with memories organized in sectors and applications each firmly assigned to one of the sectors, it is possible to use the additional selection information as sector information. Use of the sector information produces a virtual sector assignment of the individual applications that corresponds to that of a MIFARE memory card. In this way it is possible to emulate a MIFARE memory card by means of a modern data carrier, by a memory of the data carrier appearing to the reading device as a sectored memory by means of the sector information. It is preferably not recognizable to the reading device whether a genuine MIFARE memory card is physically present or whether an inventive emulated MIFARE memory card is involved.

Each sector of such an emulated MIFARE card has exactly one application stored therein. Each individual sector is preferably access-protected separately for a reading device accessing it, usually by a pair of keys assigned to the sector. It is thus also possible for those applications to be stored executably on a data carrier that were assigned to corresponding fixed sectors on different original MIFARE memory cards. Those applications that were assigned to originally different fixed sectors are preferably then combined into groups with a common identification number. The reading device accordingly interprets a thus configured data carrier as a multiplicity of MIFARE memory cards, whereby each of said MIFARE memory cards comprises exactly one group of applications that reside in pairwise different sectors. In this way the reading device can first select via the identification number a group of applications that correspond e.g. to the applications of a single original MIFARE memory card. Thereafter a special application which was e.g. originally firmly assigned to the sector 1 can be selected on the basis of the additional selection information in the form of the virtual sector assignment.

The inventive data carrier can be configured in general as a contactlessly communicating chip card, contactlessly communicating label or contactlessly communicating identification document. Further, it is possible that the data carrier is configured as a security module SAM (secure application module) in a device set up for contactless data transmission, the security module having software means for communicating contactlessly by means of a suitable interface with the help of the device. A SAM is a component secured both mechanically and by software means which serves to store secret data and to execute cryptoalgorithms.

Further, an electronic device, in particular a mobile terminal, with a contactless interface for communication with a reading device and with a plurality of access-protected memory areas on different storage media of the device can also be designed as an inventive data carrier. Each of the memory areas has an application stored therein. The memory areas are preferably formed on one or more storage media, in particular secure chip cards, which are integrated into the mobile terminal. These may be for example (U)SIM mobile communication cards, SD cards (secure digital memory cards) or EMV payment cards. EMV designates a specification for payment cards and is derived from "Europay", "MasterCard", and "Visa". By means of the inventive method it is then possible that the reading device communicates with each of the applications on the different secure chip cards via the contactless interface of the mobile terminal. The contactless interface is preferably configured as an NFC interface ("near field communication"). This permits a so-called "secure NFC" with a device in the role of a passive communication partner and with a plurality of applications stored thereon.

BRIEF DESCRIPTION OF THE DRAWINGS

The invention will hereinafter be explained by way of example with reference to the accompanying drawings. Therein are shown:

FIG. 4 a schematic representation of a second embodiment of an inventive data carrier.

DETAILED DESCRIPTION OF VARIOUS EMBODIMENTS OF THE DISCLOSURE

Figure 1:
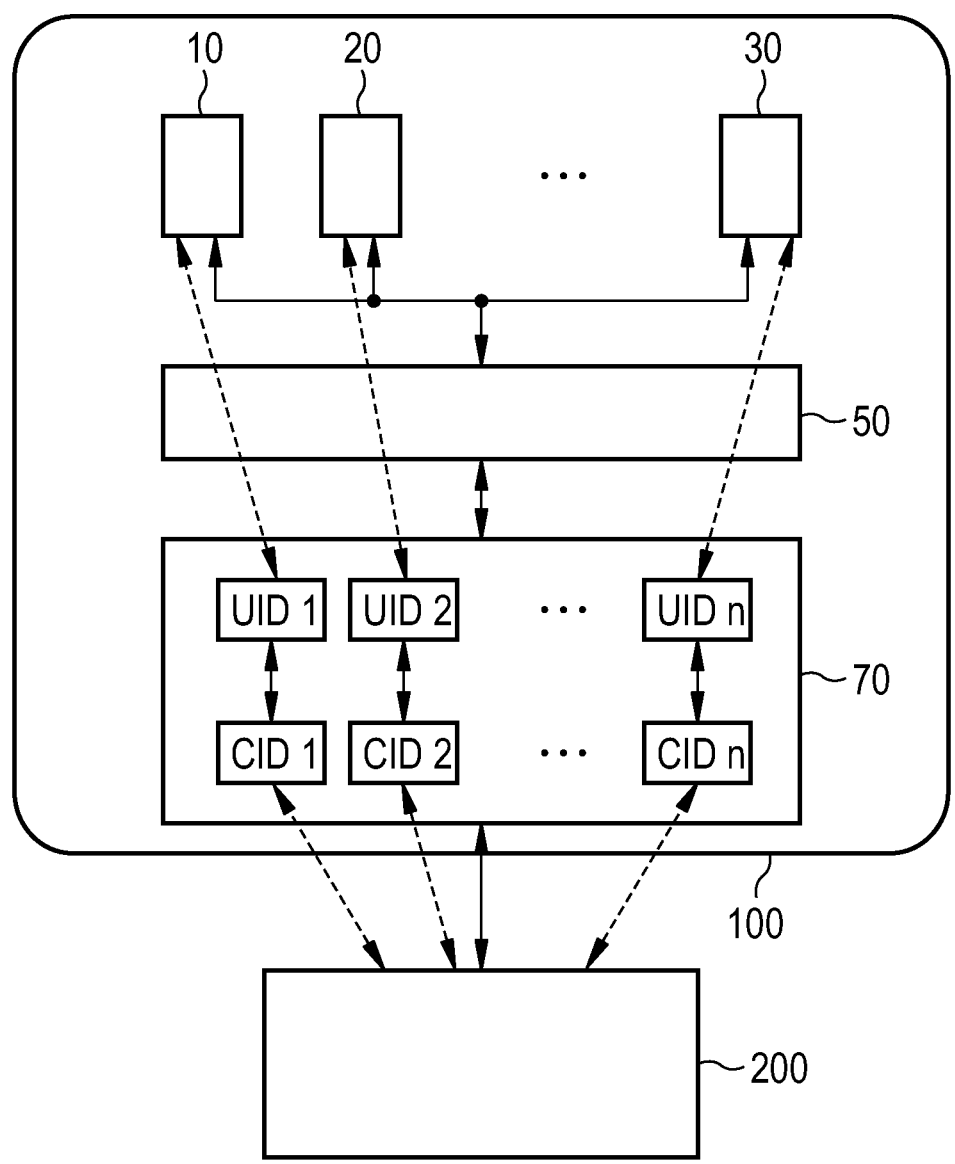
FIG. 1 a schematic representation of a first embodiment of an inventive data carrier.

Different embodiments of the invention will hereinafter be presented in more detail. FIG. 1 shows schematically a first embodiment of an inventive data carrier 100 and a reading device 200. The data carrier 100 has at least two applications 10, 20, 30 located thereon. The data carrier 100 comprises a communication device 70 and a toggling device 50 that is set up to toggle between the different applications 10, 20, 30. Each of the applications 10, 20, 30 is assigned an identification number UID1, UID2, UIDn. The identification numbers UID1, UID2, UIDn are managed by the communication device 70. When the reading device 200 enters into communication with one or more of the applications 10, 20, 30 of the data carrier 100, the reading device can select them for further communication via the identification numbers UID1, UID2, UIDn and address them in the further course of communication by means of session numbers CID1, CID2, CIDn allocated dynamically by it. Said session numbers CID1, CID2, CIDn can be linked by the communication device 70 with the identification numbers of the particular applications addressed. All communication between the applications 10, 20, 30 of the data carrier 100 with the reading device 200 takes place via the communication device 70, it being possible to toggle between the applications 10, 20, 30 by means of the toggling device 50.

Figure 2:
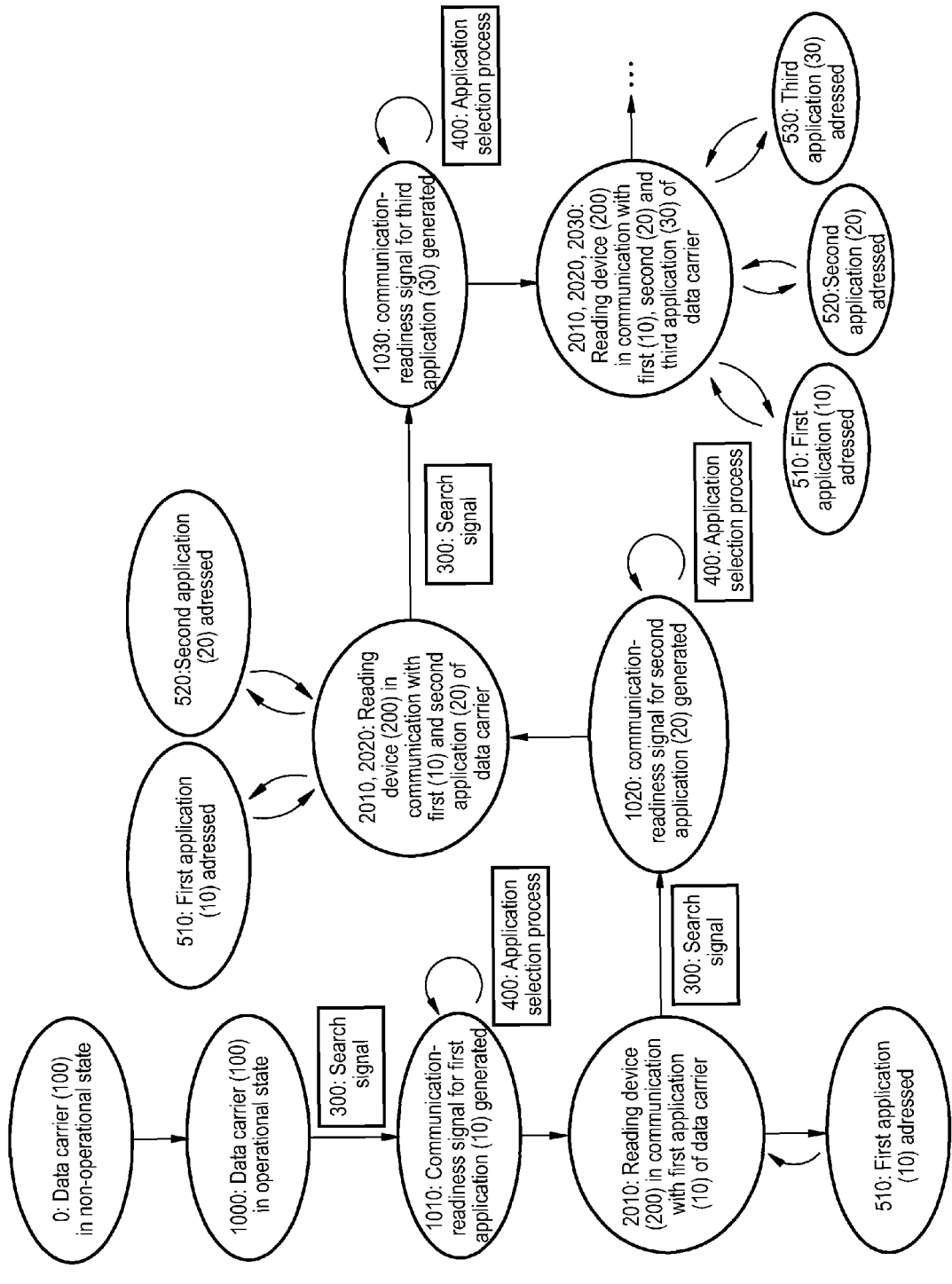
FIG. 2 a flow chart of a sequence of activities in a first embodiment of the inventive method.

FIG. 2 shows a flow chart of a sequence of activities in a first embodiment of the inventive method. The numbers designate individual method steps and states of individual components. When the inventive data carrier 100, which at the onset is in the non-operational state 0, passes into the response field of a reading device 200, it becomes operational 1000 and receives a search signal 300 from the reading device 200. The communication device 70 of the data carrier 100 generates for a first application 10 a communication-readiness signal which comprises the identification number UID1 assigned to the application 10, 1010. Said signal is emitted by the data carrier, and the application 10 is selected for further communication by the reading device 200 in the course of the selection process 400 by means of an anti-collision method.

While or before the reading device 200 communicates with the application 10 of the data carrier 100, 2010, which it addresses via the session number CID1, 510, it emits further search signals 300, and the communication device 70 of the data carrier 100 generates for a second application 20 a communication-readiness signal comprising the identification number UID2, 1020, and the application 20 is selected for further communication by the reading device 200 in the course of the selection process 400. The reading device 200 is now engaged in communication with the two applications 10 and 20 in parallel, 2010, 2020, which are addressed via the session numbers CID1, 510, and CID2, 520.

The establishment of communication of the reading device 200 with the application 30 follows analogously by a search signal 300, a communication-readiness signal generated by the communication device 70, 1030, a selection step 400, so that the reading device 200 is finally communicating in parallel with the three applications 10, 20, 30, 510, 520, 530, addressed via the session numbers CID1, CID2, CIDn, 2010, 2020, 2030. As indicated, the method can continue with further applications in the same manner.

To the reading device 200 the different applications of the inventive data carrier 100 appear to be a collection of different data carriers according to the prior art.

Figure 3:
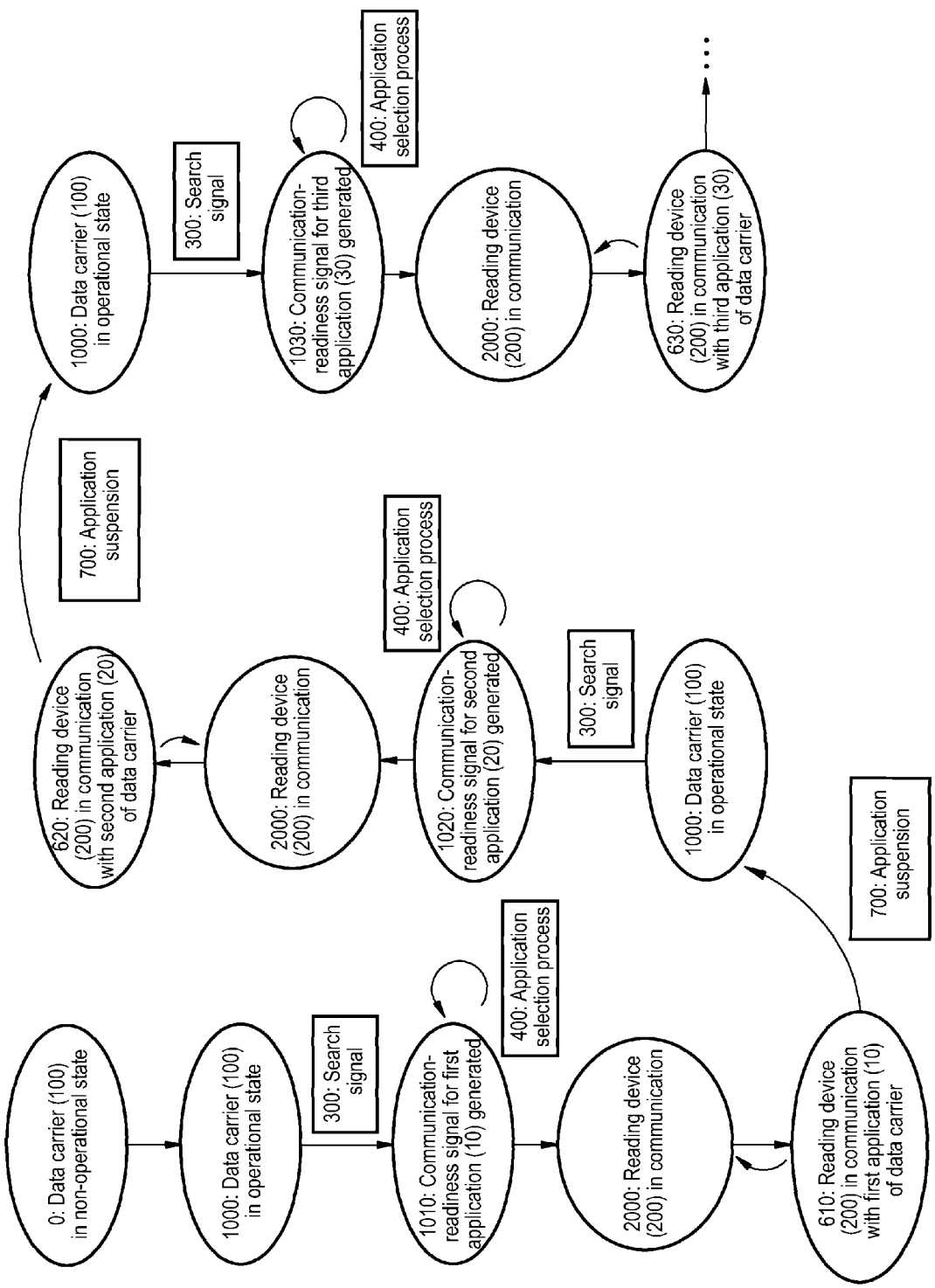
FIG. 3 a flow chart of a sequence of activities in a second embodiment of the inventive method.

FIG. 3 shows a flow chart of a sequence of activities in a second embodiment of the inventive method. The numbers designate, as in FIG. 2, individual method steps and states of individual components. The chief difference compared to the embodiment shown in FIG. 2 is that in the present example the reading device does not communicate with a plurality of applications by means of different session numbers at the same time, but with different applications in succession.

Steps and states that are the same as those in FIG. 2 are designated the same way and will not be explained again. After emission of a search signal 300 by the reading device 200, the communication device 70 of the data carrier 100 generates for a first application 10 a communication-readiness signal which comprises the identification number UID1 assigned to the application 1010, and the application 10 is selected for further communication by the reading device 200 in the course of the selection process 400 by means of an anti-collision method. The reading device 200 is communicating 2000 with the application 10, 610, and completes this communication before it emits new search signals. Therebefore the application 10 must be suspended 700, for example by means of a DESELECT command, whereby the inventive data carrier still remains operational 1000 and can thus respond to the next search signal 300 from the reading device 200 with a communication-readiness signal generated for a second application 20 and comprising the identification number UID2 assigned to the application 20. An analogous process can now follow sequentially for all applications located on the data carrier. FIG. 3 also shows the communication of the reading device with the applications 20 and 30, 620, 630.

The data carrier 100 is preferably set up to recognize whether the reading device 200 is able to handle a plurality of communication-ready applications located in its response field and to resolve any collisions occurring. The data carrier 100 evaluates for this purpose e.g. the response of the reading device 200 to communication-readiness signals emitted in parallel, and thereby recognizes the abilities of the reading device 200 for collision handling. A termination of communication by the reading device 200 can also be considered a response, if for example a reading device 200 is involved that can fundamentally process only one data carrier in its response field. If a plurality of data carriers are then located in the response field, the reading device terminates all communication with a data carrier. The data carrier 100 can thus for example toggle from a method according to the first embodiment to a method according to the second embodiment if the reading device 200 is not able to resolve collisions.

The inventive data carrier 100 possesses a further possibility for indicating to the reading device 200 that communication-ready applications are located in the response field, by the communication device 70 being able to emit signals during the course of an anti-collision method 400 that simulate the collision of at least two data carriers for the reading device 200. The reading device 200 will then try to establish contact with such applications at a later time. The signal or data pattern emitted for simulating a collision may be e.g. a code violation (e.g. ISO 14443 type A: Manchester code with simultaneous sending of a "0" and a "1") or a checksum error. In the case of anti-collision methods with several time slots (e.g. ISO 14443 type B: slotted Aloha method) the different identification numbers UID1, UID2, UIDn of the applications 10, 20, 30 located on the data carrier can be emitted in different time slots to simulate the presence of corresponding data carriers for the reading device 200.

For the reading device 200 there is also the possibility of briefly switching off the magnetic field to then, if data carriers without their own energy supply are involved, after their restart (power-on reset) select a new data carrier in the response field. According to the invention, the communication device 70 of the data carrier 100 can be set up to store in a nonvolatile memory of the data carrier 100 information about which of the applications 10, 20, 30 last communicated with the reading device 200, which of the applications 10, 20, 30 already completed active communication with the reading device 200, and the like. With the help of such information it is then possible e.g. to generate a communication-readiness signal first for an application 10, 20, 30 that did not communicate with the reading device 200 last, in order e.g. to prevent the same application 10, 20, 30 from always being served first and other applications 10, 20, 30 from possibly having to put up with long waiting periods or not being executed at all. It is also possible, however, to first generate a communication-readiness signal for that application 10, 20, 30 with which the reading device 200 actively communicated last, in order for example to bring to an end a data communication that was commenced but not completed.

FIG. 4 shows a second embodiment of an inventive data carrier 100 that can emulate one or more MIFARE memory cards MA, MB, MC, MD. MIFARE memory cards MA-MD possess a memory divided into the sectors FS1, FS2, FS3, FS4, each sector FS1-FS4 having no more than one application stored therein. Each sector FS1-FS4 is protected against unauthorized accesses separately by its own key pair, i.e. only a reading device 200 possessing the corresponding keys of a sector FS1-FS4 can access the corresponding sector FS1-FS4 and the data stored therein. It is usual that special applications on MIFARE memory cards MA-MD are assigned fixed sectors FS1-FS4. The applications are designated in FIG. 4 10A-40A, 10B-30B, 10C-30C, 40D, the added letter A, B, C, D designating the original memory card MA, MB, MC, MD from which the particular application 10A-40A, 10B-30B, 10C-30C, 40D was transferred to the data carrier 100. Thus, e.g. the application 30B is assigned to the sector FS3 of the memory card MB.

A reading device 200 expecting such a card MA-MD will accordingly only read out that sector FS1-FS4 of the memory card MA-MD in which it is looking for the corresponding application 10A-40A, 10B-30B, 10C-30C, 40D. If an application 10A-40A, 10B-30B, 10C-30C, 40D is stored on a card MA-MD, but in a sector GS1, GS2, GS3 different from that intended by the reading device 200, said application 10A-40A, 10B-30B, 10C-30C, 40D cannot be found by the reading device 200. For a data carrier 100 to be able to emulate a plurality of MIFARE memory cards MA-MD or at least a plurality of applications 10A-40A, 10B-30B, 10C-30C, 40D of MIFARE memory cards MA-MD that are assigned to the same fixed sector FS1-FS4, the inventive method can be used in different variants which will be described hereinafter.

The data carrier 100 comprises for this purpose a sectored memory 60 which is constructed fundamentally like a memory of a MIFARE memory card MA-MD. In each sector S1-S11 there is stored no more than one of the original MIFARE applications 10A-40A, 10B-30B, 10C-30C, 40D. In an efficient first variant, which is illustrated in FIG. 4, there is not necessarily a separate identification number UID1-UID3 generated for each application 10A-40A, 10B-30B, 10C-30C, 40D. It instead suffices if those applications 10A-10C; 20A-20C; 30A-30C; 40A, 40D that were originally assigned to the same fixed sector FS1-FS4 are each given different identification numbers UID1-UID3.

The applications 10A-40A, 10B-30B, 10C-30C, 40D stored in the sectors S1-S11 of the data carrier 100 are divided up into groups G1-G3 each containing only those applications 10A-40A; 10B-30B; 10C-30C, 40D that were originally assigned to pairwise different fixed sectors FS1-FS4. Each of said groups G1-G3 is assigned its own identification number UID1-UID3, and each application 10A-40A, 10B-30B, 10C-30C, 40D within such a group G1-G3 is assigned as additional selection information the originally assigned fixed sector FS1-FS4, 10A(FS1)-40A(FS4), 10B(FS1)-30B(FS3), 10C(FS1)-30C(FS3), 40D(FS4). Said thus assigned selection information generates a virtual sector assignment corresponding to that of an emulated MIFARE memory card.

The communication device 70 now generates communication-readiness signals for said groups G1-G3 of applications 10A-40A; 10B-30B; 10C-30C, 40D, the communication-readiness signal indicating a communication readiness of each individual one of the applications 10A-40A, 10B-30B, 10C-30C, 40D. The reading device 200 can select such a group G1-G3 of applications 10A-40A; 10B-30B; 10C-30C, 40D for communication via the identification number UID1-UID3. The group in question appears to the reading device 200 to be an original MIFARE memory card MA-MD. Via the additional selection information FS1-FS4 the reading device 200 can then select from the group G1-G3 the corresponding application 10A-40A, 10B-30B, 10C-30C, 40D corresponding to that sector assignment GS1-GS3 containing the desired application. The selection information FS1-FS4 in the form of the virtual sector assignment appears to the reading device 200 to be a fixed sector assignment of an application on an original MIFARE memory card. In this variant of the method for emulating MIFARE memory cards it is possible for the reading device 200 to access all applications 10A-10C; 20A-20C; 30A-30C; 40A, 40D stored on the data carrier 100 that were originally assigned to the same fixed sector FS1-FS4, independently of their actual sector position S1-S11 on the data carrier 100.

In a second, simpler variant (not shown), each application 10A-40A, 10B-30B, 10C-30C, 40D is assigned its own identification number UID1-UID3. In this way the data carrier 100 appears to a reading device 200 to be a multiplicity of MIFARE memory cards MA-MD that all contain only one application 10A-40A, 10B-30B, 10C-30C, 40D in each case. The information about which sector FS1-FS4 the particular application 10A-40A, 10B-30B, 10C-30C, 40D was originally assigned to can in turn be stored in the additional selection information assigned to said application 10A-40A, 10B-30B, 10C-30C, 40D.

The communication device 70 of the data carrier 100 thus generates communication-readiness signals for all applications 10A-40A, 10B-30B, 10C-30C, 40D with different identification numbers UID1-UID3 in each case. The reading device 200 can then select and execute an application 10A-40A, 10B-30B, 10C-30C, 40D via the corresponding identification number UID1-UID3, provided that the sector assignment FS1-FS4 stored in the additional selection information matches the sector assignment GS1-GS3 desired by the reading device 200. The reading device 200 can in this way separately access each of the applications 10A-40A, 10B-30B, 10C-30C, 40D stored on the data carrier 100. Different applications 10A-10C; 20A-20C; 30A-30C; 40A, 4D that were originally assigned to the same fixed sector FS1-FS4 are now all available to the reading device 200, independently of their actual sector position S1-S11 on the data carrier 100. However, it is possible that the reading device 200 selects for communication a large number of applications 10A-40A, 10B-30B, 10C-30C, 40D that do not correspond to the sector assignment GS1-GS3 desired by the reading device 200, since each application 10A-40A, 10B-30B, 10C-30C, 40D has been assigned its own identification number UID1-UID3. However, this increases the total communication effort between the reading device 200 and the applications 10A-40A, 10B-30B, 10C-30C, 40D on the data carrier 100, so that the method described as the first variant is generally to be preferred if an efficient data interchange is desired.

In a third embodiment (not shown), an electronic device, in particular a mobile terminal, can be configured as the data carrier 100 for communication with a reading device 200. The mobile terminal comprises for this purpose a contactless interface, for example an NFC interface. For communication with the reading device 200 the mobile terminal performs the role of the passive communication partner ("slave") while the reading device 200 functions as the active communication partner ("master"). The applications 10, 20, 30 present on the data carrier 100 are each stored in separate memory areas of the data carrier 100, preferably one application 10, 20, 30 per memory area.

The memory areas are located on a plurality of secure chip cards, e.g. (U)SIM mobile communication cards, SD cards, EMV payment cards or the like, integrated in the mobile terminal. This protects the corresponding applications 10, 20, 30 and the data generated thereby from unauthorized access. The communication device 70 of the mobile terminal controls the communication of the applications 10, 20, 30 on the chip cards with the reading device 200 via the contactless interface. This permits a so-called "secure NFC" between a reading device 200 and a plurality of applications 10, 20, 30 stored securely on a data carrier 100.

The invention claimed is:

1. A method for contactless communication of a reading device with at least two communication-ready applications located on a portable data carrier, comprising the steps:
generating a first communication-readiness signal to the reading device for a first of the at least two applications, the communication-readiness signal comprising a first identification number which is assigned to the first of the at least two applications and indicates to the reading device the communication readiness of said first application, and
generating a second communication-readiness signal to the reading device for a second of the at least two applications, the second communication-readiness signal comprising a second identification number different from the first identification number, which is assigned to said second application and indicates to the reading device the communication readiness of said second application,
wherein the first communication-readiness signal is generated for a first group of applications comprising a first plurality of applications including the first application, and the first identification number is assigned to every application in the first group, and the second communication-readiness signal is generated for a second group of applications comprising a second plurality of applications including the second application, and the second identification number is assigned to every application in the second group, the first communication-readiness signal indicating to the reading device the communication readiness of every application of the first group, and the second communication-readiness signal indicating to the reading device the communication readiness of every application of the second group.

2. The method according to claim 1, wherein each of the applications of the first group and/or each of the applications of the second group is assigned additional selection information.

3. The method according to claim 1, wherein the reading device emits search signals, the signals generated for the applications comprising response signals to the search signals.

4. The method according to claim 1, including the further step of toggling between the applications for communication of a selected application with the reading device.

5. The method according to claim 4, wherein toggling is effected by branching or by context switching.

6. The method according to claim 1, wherein the reading device selects for further communication one or more of the at least two applications via the identification numbers assigned to the applications.

7. The method according to claim 6, wherein each of the applications of the first group and/or each of the applications of the second group is assigned additional selection information; and wherein the reading device selects for further communication one or more of the at least two applications via the identification numbers assigned to the applications and via the additional selection information assigned to the applications.

8. The method according to claim 6, wherein for one or more of the at least two applications that have not yet been selected for further communication by the reading device, the communication-readiness signal is generated while the communication with one or more others of the at least two applications that have been selected for further communication by the reading device is not yet completed.

9. The method according to claim 6, wherein for one or more of the at least two applications that have not yet been selected for further communication by the reading device, the communication-readiness signal is generated after one or more others of the at least two applications have been suspended after completion of communication with the reading device.

10. The method according to claim 6, wherein the data carrier informs the reading device by means of collision signals that one or more of the at least two applications that have not yet been selected for further communication by the reading device are present by signals being sent that simulate a collision between a plurality of applications.

11. The method according to claim 6, wherein the data carrier informs the reading device by means of an allocation of one or more time slots that one or more of the at least two applications that have not yet been selected for further communication by the reading device are present.

12. The method according to claim 6, including the further step of storing information in a nonvolatile memory of the data carrier about which of the at least two applications has already completed active communication with the reading device.

13. The method according to claim 6, wherein, upon new communication of the reading device with the data carrier, a communication-readiness signal is emitted first for the application with which active communication was effected last.

14. The method according to claim 6, wherein the reading device addresses an application selected for further communication via a dynamically allocated session number.

15. The method according to claim 14, wherein upon addressing, the session number is linked on the data carrier with the identification number assigned to the selected application.

16. The method according to claim 15, wherein each of the applications of the first group and/or each of the applications of the second group is assigned additional selection information; and wherein upon addressing, the session number is linked on the data carrier additionally with the additional selection information assigned to the selected application.

17. The method according to claim 1, wherein the data carrier recognizes by a response of the reading device to communication-readiness signals emitted by the data carrier whether the reading device is set up to resolve a collision between a plurality of applications.

18. The method according to claim 1, wherein the reading device communicates with a plurality of the at least two applications in parallel.

19. The method according to claim 1, wherein the reading device interprets the identification numbers as identification numbers of different data carriers.

20. The method according to claim 19, wherein each of the applications of the first group and/or each of the applications of the second group is assigned additional selection information; and wherein the data carrier generates the additional selection information as a virtual sector assignment and the reading device interprets the additional selection information as a sector assignment of a memory area of one of the different data carriers, whereas the different data carriers may be emulated data carriers.

21. The method according to claim 1, further comprising the step of selecting at least one of the first or second group of applications for communication using the respective first or second identification number.

22. A contactlessly communicating portable data carrier, comprising at least a first and second application stored thereon and a communication device for controlling communication between a reading device and the at least first and second applications, wherein the communication device is configured to generate a first communication-readiness signal to the reading device which indicates to the reading device a communication readiness for the first application and a second communication-readiness signal to the reading device which indicates the reading device a communication readiness for the second application and comprise an identification number assigned to the corresponding communication-readiness application,
wherein the first communication-readiness signal is generated for a first group of applications comprising a first plurality of applications including the first application, and the first identification number is assigned to every application in the first group, and the second communication-readiness signal is generated for a second group of applications comprising a second plurality of applications including the second application, and the second identification number is assigned to every application in the second group, the first communication-readiness signal indicating to the reading device the communication readiness of every application of the first group, and the second communication-readiness signal indicating to the reading device the communication readiness of every application of the second group.

23. The data carrier according to claim 22, wherein the communication device is set up to assign additional selection information to each of the applications of the group.

24. The data carrier according to claim 22, wherein the communication device is set up to generate the communication-readiness signals as response signals to search signals received from a reading device.

25. The data carrier according to claim 22, including a toggling device which is set up to toggle between the applications of the data carrier for communication of the applications with a reading device.

26. The data carrier according to claim 25, wherein the toggling device is set up to toggle between the applications of the data carrier by means of branching or context switching.

27. The data carrier according to claim 22, wherein the communication device is set up to establish the communication between a reading device and an application addressed by the reading device via a session number.

28. The data carrier according to claim 27, wherein the communication device is set up to link, upon addressing of the addressed application, the session number with the identification number assigned to the addressed application.

29. The data carrier according to claim 28, wherein the communication device is set up to assign additional selection information to each of the applications of the first or second group of applications; and wherein the communication device is set up to link, upon addressing of the addressed application, the session number additionally with the additional selection information assigned to the addressed application.

30. The data carrier according to claim 22, wherein the communication device is set up to determine those applications among the at least two applications that are ready for communication with a reading device.

31. The data carrier according to claim 30, wherein the communication device is set up to emit communication-readiness signals for one or more of the at least two applications that are ready for communication with a reading device and not yet communicating with a reading device while the communication with one or more others of the at least two applications is not yet completed.

32. The data carrier according to claim 30, wherein the communication device is set up to emit communication-readiness signals for one or more of the at least two applications that are ready for communication with a reading device and not yet communicating with a reading device after one or more others of the at least two applications have been suspended after completion of communication with a reading device.

33. The data carrier according to claim 22, wherein the communication device is set up to inform the reading device via collision signals simulating a collision between a plurality of applications that one or more of the at least two applications located on the data carrier that have not yet been selected for further communication by the reading device are present.

34. The data carrier according to claim 22, wherein the communication device is set up to recognize by a response of a reading device to communication-readiness signals emitted by the communication device whether the reading device is set up to resolve collisions between a plurality of applications.

35. The data carrier according to claim 22, wherein the data carrier is configured as a contactlessly communicating chip card, contactlessly communicating label, contactlessly communicating identification document or as a (U)SIM mobile communication card.

36. The data carrier according to claim 22, wherein the data carrier has a dual interface and can be operated both contactlessly and with contact.

37. The data carrier according to claim 22, including a memory which is divided into sectors, each of the sectors having no more than one of the at least two applications stored therein.

38. The data carrier according to claim 37, wherein each of the sectors is access-protected separately for access by a reading device to applications stored in said sectors.

* * * * *